United States Patent [19]
Deo et al.

[11] Patent Number: 5,973,612
[45] Date of Patent: Oct. 26, 1999

[54] FLEXIBLE OBJECT NOTIFICATION

[75] Inventors: Vinay Deo, Bellevue; Michael John O'Leary, Redmond; Robert B. Seidensticker, Jr., Woodinville, all of Wash.

[73] Assignee: Microsoft Corporation, Redmond, Wash.

[21] Appl. No.: 08/833,296

[22] Filed: Apr. 4, 1997

Related U.S. Application Data

[60] Provisional application No. 60/025,748, Sep. 19, 1996.

[51] Int. Cl.⁶ ........................................... H04Q 7/18
[52] U.S. Cl. ................................. 340/825.44; 340/825.46; 455/426; 455/38.4; 455/140; 455/517; 455/575; 455/38.5; 370/313
[58] Field of Search ........................... 340/825.44, 311.1, 340/825.52, 825.69, 407.1, 825.46, 407.2, 815.4, 815.53, 384.1; 455/426, 38.4, 140, 526, 517, 575, 31.1, 38.5; 370/310, 312, 313, 314; 345/133, 112; 1/1

[56] References Cited

U.S. PATENT DOCUMENTS

| | | | |
|---|---|---|---|
| 4,975,693 | 12/1990 | Davis et al. | 340/825.44 |
| 5,012,234 | 4/1991 | Dulaney et al. | 340/825.44 |
| 5,182,553 | 1/1993 | Kung | 340/825.44 |
| 5,258,751 | 11/1993 | DeLuca et al. | 340/825.44 |
| 5,293,161 | 3/1994 | MacDonald et al. | 340/825.46 |
| 5,381,138 | 1/1995 | Stair et al. | 340/825.44 |
| 5,396,229 | 3/1995 | Miyauchi | 455/38.4 |
| 5,493,280 | 2/1996 | Shibayama | 340/825.44 |
| 5,495,236 | 2/1996 | Minami | 340/825.44 |
| 5,508,688 | 4/1996 | Mochizuki | 340/825.44 |
| 5,604,491 | 2/1997 | Coonley et al. | 340/825.44 |
| 5,650,776 | 7/1997 | Mitchell et al. | 340/825.44 |
| 5,701,258 | 12/1997 | Harris et al. | 340/825.44 X |
| 5,739,759 | 4/1998 | Nakazawa et al. | 340/825.44 |
| 5,784,001 | 7/1998 | DeLuca et al. | 340/825.44 |
| 5,815,081 | 9/1998 | Motohashi | 340/825.44 |
| 5,844,498 | 12/1998 | Ide | 340/825.44 |

*Primary Examiner*—Brian Zimmerman
*Assistant Examiner*—William H. Wilson, Jr.
*Attorney, Agent, or Firm*—Ronald M. Anderson

[57] ABSTRACT

Alternative notification methods for a portable wireless receiver that is able to receive paging objects (i.e., data objects) in addition to conventional alphanumeric page messages. When a paging object is received, the user may be notified of the receipt of the paging object using a visual alert or an audible alert. The user can selectively determine whether the sender of the page object will be allowed to determine the type of audible and/or visual notification provided the user. Various parameters associated with each type of directory in which page objects are stored and with the page objects indicate the preferences of the user and the sender for notifying the user of the receipt of the page object. The invention is also applicable to other types of portable wireless data receivers, such as a cell phone.

20 Claims, 4 Drawing Sheets

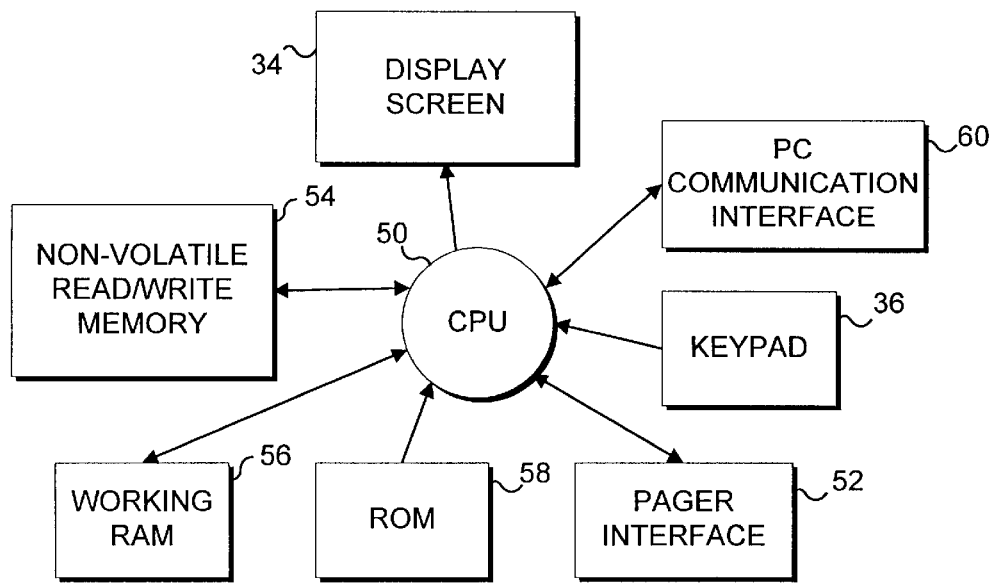
FIG. 2
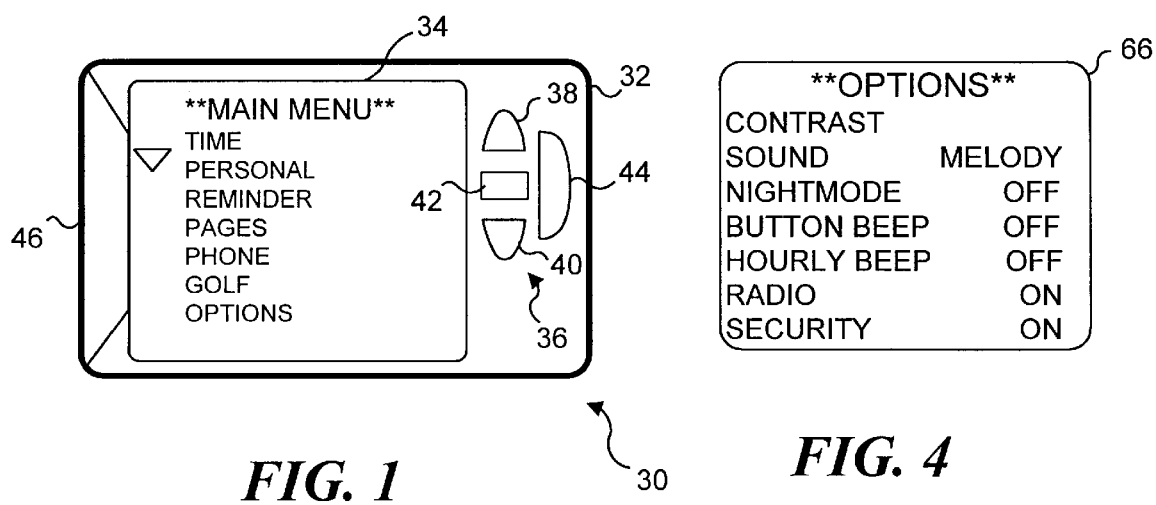
FIG. 1
FIG. 4

| Icon | Name | Description |
|---|---|---|
|  | DONE/NOT DONE | INDICATES WHETHER A TASK IS COMPLETED OR NOT. |
|  | ANTENNA | THE DEVICE IS IN RANGE TO RECEIVE A PAGE TRANSMISSION. |
|  | SLASHED ANTENNA | THE DEVICE IS OUT OF RANGE TO RECEIVE A PAGE TRANSMISSION. |
|  | SPEAKER | AUDIBLE SOUND IS ENABLED. |
|  | WAVES | INDICATES THE DEVICE IS IN VIBRATE MODE. (WHEN NEITHER WAVES NOR SPEAKER ICONS IS SHOWING, THE DEVICE IS IN THE MUTE STATE.) |
| <PADLOCK> | LOCKED PAGE | PASSWORD PROTECTION IS ENABLED. |
| <BELL> | SHORT-TERM REMINDER | |
| <PRESENT> | LONG-TERM REMINDER | |
| <ENVELOPE> | ENVELOPE | THERE IS AN UNREAD PAGE. |
| <KEY> | PROTECTION | THE CURRENTLY VIEWED PAGE IS PROTECTED. |
| <OBJECT> | UNPROCESSED OBECT(S) | THERE IS AN UNPROCESSED DATA PAGE. |
| <CLOCK> | NIGHT MODE | NIGHT MODE IS CURRENTLY ACTIVE. |
| <OVER-LAID PAPERS> | PAPERS | A DUPLICATE PAGE HAS BEEN RECEIVED. |
| <UPWARD POINTING TRIANGLE> | UP ARROW | WHEN VISIBLE, INDICATES THAT THERE IS HIDDEN TEXT ABOVE THE TEXT WHICH CURRENTLY VISIBLE. |
| <DOWNWARD POINTING TRIANGLE> | DOWN ARROW | WHEN VISIBLE, INDICATES THAT THERE IS HIDDEN TEXT BELOW THE TEXT WHICH CURRENTLY VISIBLE. |

*FIG. 3*

FLEXIBLE OBJECT NOTIFICATION

RELATED APPLICATION

This application is a continuation-in-part of prior copending provisional Application Ser. No. 60/025,748, filed Sep. 19, 1996, the filing date of which is hereby claimed under 35 United States Code Section 119(e).

FIELD OF THE INVENTION

The present invention generally relates to a system and method for maintaining personal information data, and more specifically, to a system and method for notifying a user of a readily transportable device that displays the data of a change to the data with a selectable form of notification.

BACKGROUND OF THE INVENTION

Personal information managers (PIMs) are tools that greatly enhance access to information required in various social and business activities. The personal information may include lists of important telephone numbers, scheduled events or meetings, addresses, important dates, things to be done, items to be purchased—in short, almost any type of data that might be needed by a person. To facilitate entry and storage of data into such tools, they are generally made sufficiently large to incorporate a QWERTY keyboard. However, including a full keyboard within a PIM results in a package that tends to be too large to be conveniently carried on one's person. Clearly, a smaller package and a different approach for entering the data are required if the device is to be readily accessible at all times. Any device that cannot easily be carried within a pocket, or attached to a person's body or clothing is likely to be left behind and will thus be unavailable when needed.

One solution to this problem that has already been developed is the Timex Corporation DATA LINK™ wristwatch. This wristwatch includes a microprocessor and non-volatile memory used to store data that can subsequently be recalled to appear on a liquid crystal display (LCD) screen of the watch. Data are entered on a personal computer, for example, using Microsoft Corporation's SCHEDULE+™ or Lotus' ORGANIZER™ personal scheduling software. To store selected data within the non-volatile memory of the wristwatch, an "export to DATA LINK™ wristwatch" feature is executed in the software running on the personal computer that causes lines on the computer display to flash in a manner that encodes the selected data. A sensor on the wristwatch detects the flashing lines on the computer monitor, and the data encoded and conveyed thereby are decoded and stored in the memory of the wristwatch for subsequent recall by the user.

While a wristwatch that stores data for access by a user is a significant step forward in making the data available when required, it has several limitations. The LCD of the watch is relatively small and only a few lines of text can be continuously displayed. Further, the memory of the wristwatch is also limited by size and cost restraints. Further, real editing of the data stored in the wristwatch is impractical. Unless the wristwatch is brought to the personal computer, the data stored in the memory of the watch cannot be changed.

What is required to achieve a better solution to the problem is a different type of package for a data management system that is sufficiently small to be readily transportable, but is capable of displaying more data, and includes additional functions that are not practical in the DATA LINK™ wristwatch. For example, it would be desirable to be able to execute simple software routines on the device. It would be desirable to be able to transmit the code required to implement the software routines to the device for storage in its memory, even when the device is not in the vicinity of a personal computer, just as it should be possible to remotely modify the other types of data stored by the device. Furthermore, while paging devices can typically be set by the user to provide either a visual, audio, or vibratory signal (or combination thereof) to notify that a page message has been received, it would be desirable to enable greater versatility in determining the manner in which a person using the device that stores personal information data is notified of a change in the data or of the receipt of page objects conveying other types of data. For example, if the data being transmitted relate to a schedule change to which the recipient must respond immediately, the user might prefer to be provided with a specific type of notification indicating that high priority data have been received by the device. In contrast, the user may prefer that information not requiring immediate action be sent with a different type of notification indicating that the recipient need not react immediately. It would also be desirable for the user to selectively enable the party sending a change in the data to determine the type of notification provided the user, or alternatively, to restrict the type of notification for a particular type of data received by the device.

SUMMARY OF THE INVENTION

In accord with the present invention, a method is defined for selectively notifying a recipient that a data object transmitted from a remote site has been received on a portable receiver carried by the recipient. The method includes the step of appending a sender preference to the data object transmitted to the recipient. The sender preference identifies at least one of a plurality of options for notifying the recipient that the data object has been received. The plurality of options include an option in which the sender has not provided any notification. Further, the recipient is enabled to define a recipient preference for being notified of the receipt of the data object using at least one of the plurality of options. Upon receipt of the data object by the portable receiver, the method provides for logically combining the sender preference with the recipient preference to produce a logical result that determines how the recipient will be notified. Using the logical result, the portable receiver is controlled to effect the notification of the recipient as indicated by the logical result.

The options for notifying the recipient preferably include an audible notification option, a visual notification option, and a combined audible and visual notification option. In connection with the audible notification option, the recipient can be notified using either an audible alarm signal, a melody, and/or a vibration of the portable receiver. The visual notification option includes a change in a visual display, e.g., display of a text message or a flashing indicator.

When transmitting the data object, the sender preference for notifying the recipient of the receipt of the data object is preferably defined by a notify bit mask appended to the data object. In addition, a data object preference is preferably defined within the portable receiver for each different type of data object received. The data object preference is logically combined with the sender preference and the recipient preference to determine how the recipient will be notified of the receipt of the data object. The data object preference is associated with a directory in which the data object will be stored after being received by the portable receiver.

Generally, the recipient preference has priority over the sender preference in determining the option used for notifying the recipient of the receipt of the data object. The recipient preference comprises a field of binary data that include a bit determining whether the sender preference will be used in determining the option used for notifying the recipient of the receipt of the data object. Similarly, the sender preference includes a field of binary data, including an index to one of a plurality of different audio notification options selectively settable to notify the recipient of the receipt of the data object. The sender preference and/or the recipient preference can optionally indicate a selected vibration pattern that should be used for notifying the recipient of the receipt of the data object, where the vibration pattern is selected from a plurality of different defined vibration patterns.

A further aspect of the present invention is directed to a system for selectively notifying a recipient that a data object transmitted from a remote site has been received on a portable receiver carried by the recipient. The system includes a memory for storing a plurality of machine instructions that define a plurality of functions implemented by the portable receiver, and a visually perceptible display for producing a visual notification. Further, a sound transducer is included for producing an audible notification. A processor is coupled to the memory, the display, and the sound transducer and is controlled by the machine instructions to implement functions that are generally consistent with the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a plan view of a combined portable wireless receiver and data management device embodying the present invention (referred to by the project name "Nomad");

FIG. 2 is a schematic functional block diagram of Nomad;

FIG. 3 is a table showing the icons used by Nomad;

FIG. 4 is a display screen of Options presented on Nomad;

DESCRIPTION OF THE PREFERRED EMBODIMENT

Figure 5:
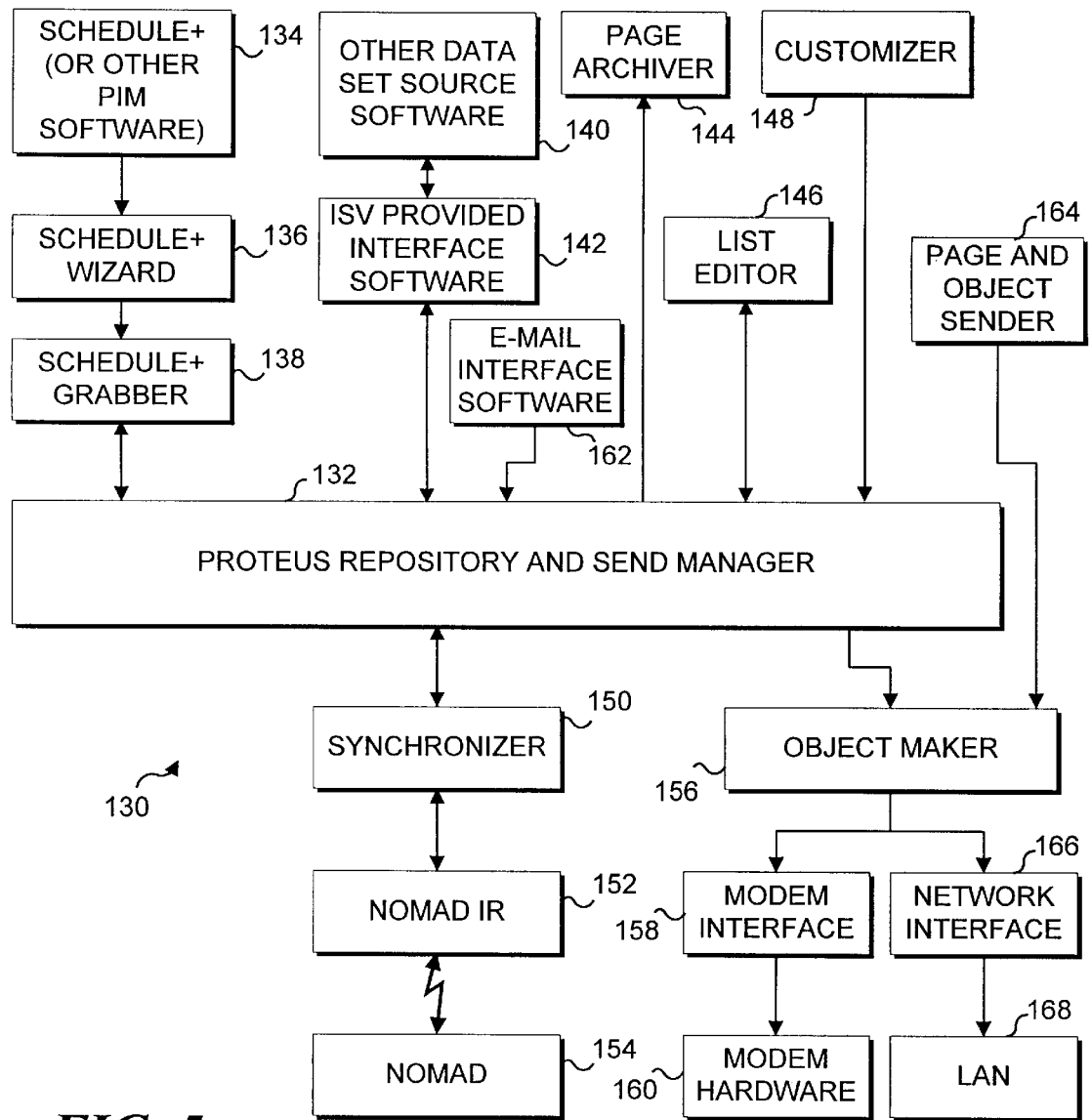
FIG. 5 is a block diagram illustrating the data exchange system between a personal computer and Nomad through an infrared data port and via paging transmissions.

A preferred form of the present invention is embodied in a combination pager and data management device, which is referred to herein by its project name as "Nomad." However, it is contemplated that the present invention can also be practiced using other readily portable electronic devices. For example, a combination cellular phone and data management device is contemplated that would offer virtually all of the benefits and advantages of Nomad. Such devices will have enhanced utility compared to existing portable data management devices, and the functions and portability of such devices will more likely encourage the user to carry the device at all times. Accordingly, it is not intended that the scope of the present invention be limited by the disclosure of the present preferred combination of pager and data management device.

User Interface

A top view of a Nomad pager and data management device 30 is shown in FIG. 1. Nomad includes a housing 32. The user interface for the device includes a keypad 36 disposed on the top of housing and having four buttons that are used to control the display and the functions performed by Nomad in connection with its conventional paging function and its novel data management functions. The buttons comprise an Action button 42, a Back button 44, an Up button 38, and a Down button 40. The buttons navigate the user through a directory/menu hierarchy like that shown in FIG. 1. The Action/Back buttons are paired as opposites having a pair functionality similar to that of the Enter and Escape keys on a conventional QWERTY keyboard. The Action button takes the user in (to a selected lower level) and the Back button takes the user out (to a next higher [or parent] level). The Up/Down buttons are another functional pair of buttons that move the user up and down within a display 34. Display 34 is preferably a liquid crystal display (LCD), which in this embodiment, can display a maximum of eight lines, with 17 characters per line. Other types and sizes of displays can alternatively be used.

Referring now to FIG. 2, a functional block diagram illustrates the components comprising Nomad. An 8-bit central processing unit (CPU) 50 implements the software controlled functions performed by Nomad in this exemplary preferred embodiment; however, it should be understood that other types of CPUs using more or less bits could alternatively be used. CPU 50 is coupled to display 34 so that text and graphic icons generated in accord with the controlling software appear on the display. Data that are downloaded or entered by the user into Nomad are stored in a non-volatile read/write memory 54 and this memory is thus bidirectionally coupled to the CPU, which reads and writes the data in a serial stream. The capacity of the non-volatile memory is about 8 Kbytes in this embodiment. A working random access memory (RAM) 56 (having a capacity of about 4 Kbytes in this embodiment) is also coupled bidirectionally to the CPU, and provides volatile storage for binary instructions that are executed by the CPU and storage for temporary data such as registers. Default values for configuration options and other variables are stored in a read only memory (ROM) 58, which has a capacity of about 40 Kbytes in Nomad. The ROM is also used to store the operating code that controls the basic functionality of Nomad, e.g., its conventional paging function, and other operating system kernel functions (e.g., execution of compact software applications).

Paging signals received by Nomad are handled through a pager interface 52, which is coupled to CPU 50. Preferably, the paging capability is bidirectional. As already noted, keypad 36 provides a simple user interface to permit control of the device, editing, and other user determined selections that are entered with only four buttons. Since the data stored in non-volatile memory 54 are likely to be more extensive than a user would care to enter using only the four buttons, such data are most efficiently entered through a PC communication interface 60. Preferably, this interface comprises an infrared sensor/transmitter 46 (shown in FIG. 1), which communicates through an infrared data port of a personal computer (PC) (not shown). The data are downloaded from the PC to Nomad through the PC communication interface or alternatively, by a paging signal transmission, and are uploaded to the PC from Nomad through this interface.

Screen Layout

Nomad's display 34 is employed to display bitmapped characters in 8 rows by 17 columns, allowing a substantial amount of information to be viewed at one time in this exemplary preferred embodiment. Although not shown in FIG. 1, above the display area will be a row of icons (further described below), and on the top and bottom left-hand side of the display area may be one or two auxiliary icons resembling up and down arrows, which are used to indicate that lines of items are available above and/or below the lines currently presented on the display. The up icon indicates hidden lines above the visible text, and the down icon indicates hidden lines below the visible text.

Navigation and Menu Support

Navigation on Nomad is done with hierarchical menus, enabling the user to move through a tree structure. FIG. 1 illustrates the Main Menu on display 34. The first line of a menu is typically its title (" MAIN MENU " in this case). The menu title is in upper case and is set off with asterisks to visually distinguish it from the other items in the menu. The title is optional—the software used to load the data into Nomad (executed on the PC) can be employed to enable the user to select a title for a menu.

The user moves a selection line (which causes the line to appear in reverse video on the display) up and down to select a desired list item. When the selection line is at the bottom and the down (arrow) icon is showing on the display, the next Down button push scrolls the list up one line, keeping the selection line at the bottom. When the selection line is on the last list item, the down (arrow) icon is no longer displayed, and additional Down button pushes do nothing. The analogous process applies to the Up arrow button. The title line is never selectable, but it scrolls off the screen as if it were just another list item as depression of the Down button moves the selected line below the original bottom line displayed.

Icon Support

The table illustrated in FIG. 3 is a list of Nomad pager icons and includes a brief description of most icons that are displayed. In connection with the envelope icon in this Figure, an object is considered read if the user responds to the notification that the object has arrived. Thus, if the user is away from the Nomad pager, and therefore does not press any buttons in response to a page event, the page will be considered unread. If no audio or visual notification accompanies the page, it is assumed that the user must view the page in order for it to be read. In regard to the Object icon, only object pages can be received, but unread. An object page includes personal information management (PIM) data such as a new appointment, an appointment deletion, a replacement appointment, a new phone number, and a new or changed address, and data that are to be paired with non-PIM applets already resident in Nomad memory, new applets, and new applet/data pairs. (An "applet" is a term used for a relatively small and compact software application designed to be executed in the limited memory environment available on Nomad.) The data transmitted by itself (i.e., not in an applet/data pair) can be a single record or a data set comprising a plurality of related records. When object pages are received and read, unlike ordinary pages, they are not automatically accepted (unless auto accept is enabled). The user must decide to accept or discard the object page, and once this action is taken, the object is considered processed.

Nomad Pager User-Settable Options

When the user selects "Options" from the Main Menu, a list of user-settable options 66 is displayed, as shown in FIG. 4. The user navigates through the list using the Up and Down buttons. Below is the list of user-settable options available in the preferred embodiment of Nomad. The entries and their defaults are listed below in the order that they appear in the exemplary preferred embodiment.

It should be noted that Paging carriers may customize the options that are available to their paging customers.

Contrast. When the user presses the Action button, the display shows:

Press Up/Down to change contrast

The up and down buttons increase and decrease the level of display contrast, respectively. The user presses the Back button to complete the operation and return to the Options list.

Sound MELODY. This setting determines the type of audio notification that is enabled. There are three types of audio: MELODY, VIBRATE, and MUTE. The default audio mode is MELODY. In this default state, notification occurs unconstrained, as requested by events.

When this option is set to VIBRATE, display notification may still happen, but no audible notification occurs. Instead, the entire pager vibrates to notify a user that a page or paging object has been received. This option is useful when the user does not want the audible melody to disturb anyone in the proximity of the user. For example, assume that the user is going to the theater. To avoid Nomad's audio notification, the user sets Sound to VIBRATE. When enabled, any event that would have triggered a beep instead triggers a default vibrate sequence. Any event that does not specify a beep notification doesn't trigger a vibrate notification.

The final option is MUTE, which is the opposite of the option MELODY. When enabled, display notification may still happen, but no audio (beep or vibrate) notification occurs. Therefore, no sound or vibrate requests will occur. Only display notification may occur, if any.

Note: Any setting remains enabled until the user changes it. None of these settings time out, i.e., the settings do not change to a different value after a time interval has lapsed.

Night Mode ON. Night Mode is a sequence of reminders for redefining the notification settings at user-specified times. These reminders and their corresponding actions are composed by the user on the PC. The reminders are able to launch applets when they mature and optionally notify the user.

A common use of Night Mode would be to determine the times Nomad should disable audio notification. For instance, during a specified period, when the user will usually be sleeping, audible notification of incoming pages will not be desired and should be turned off.

The default value for Night Mode is ON. The Action button will toggle the state of this setting from ON to OFF, and vice-versa. By setting the Night Mode option to OFF, only the Night Mode reminders are disallowed. By turning Night Mode on, applet-launching reminders are enabled to occur. The manner in which Night Mode occurs, and the actions its reminders dictate, are determined solely through the settings of the software that downloads data from the personal computer.

Button Beep OFF. This setting determines whether a button press will be accompanied by an audible beep. The default setting is OFF. The Action button will toggle the state of this setting from ON to OFF, and vice-versa.

Hourly Beep OFF. This setting determines whether an alarm (which triggers an audio notify event) will occur every hour, on the hour. The default setting is OFF. The Action button will toggle the state of this setting from ON to OFF, and vice-versa.

Set Time. Selecting this option will take the user to a screen in which the current date and time are displayed on the first through third lines of text in this exemplary preferred embodiment. The time is double height and therefore uses two rows. The next line indicates the field that will be updated when the user presses the Up and Down buttons, and this field will be blinking on the device. The user presses the Action button to cycle through the updateable fields which are "Yr" (Year), "Mon" (Month), "Day," "Hr" (Hour), "Min" (Minute), and "Sec" (Second). When the user finishes setting the date and time, the Back button is pressed to save the entry and return to the Main Menu. It will be understood that these details are not limiting and are not specific to the present invention.

Notify Support

Notify refers to the visual and/or audio action(s) that alert the Nomad user that an event such as the receipt of a data object or a page message has occurred. The Notify actions include changing the display to provide text indicating the receipt of data, flashing an LED, changing the status of an icon, vibrating the housing of the device, making an audible sound or melody, etc.

Audio and visual notification are mutually exclusive settings (i.e., an audio setting affects the audio notification, but does not affect the visual notification, and a visual setting affects a visual notification, but not an audio notification). In most cases, as with many pagers today, the default notification of the receipt of a conventional paging message is both visual and audio to afford the user with as much information as possible at one time. In the case of Nomad, which dramatically increases the functionality available to pager users, many more events may occur that cause notification, such as the receipt of a paging object (i.e., data page transmission). Thus, it is likely that users will wish to customize notification for different types of events.

Display Notification: A Display Notification is any screen display change that happens in response to a Device Event (page arrival, appointment coming due, etc.). If the Nomad display is off, a display notification turns it on. If the display is already on, a display notification temporarily interrupts whatever the user is doing to provide the display notification. If display notification is disabled, the display doesn't change when a device event occurs (though there can still be an audio notification).

The details of the display notification (changes to the display) are determined through the data exchange software running on the PC that sets up Nomad and cannot be controlled by any user selected options displayed on Nomad. Paging carriers (service providers) can choose logical default settings for Nomad that meet the needs of their paging customers. Another way to control notification is through custom applets. Applets have access to Nomad kernel commands, which will allow control of display notification details independent of the data exchange software on the PC used to set up the options on Nomad.

Audio Notification: An Audio Notification is any sound (beep, series of tones, melody) or vibration that happens in response to a device event. Audio notification in general can be controlled in a number of ways. As with display notification, it can be controlled within applets running on Nomad and can be set for each object received. But further, the user has direct control over the global audio notification settings on Nomad through selection of the Main Menu's Options. Unlike conventional paging devices, a plurality of different vibration patterns can optionally be defined and selectively used for notification of different data objects. The vibration pattern is produced by changing the duration of a sequence of intervals during which the device vibrates, e.g., two intervals of vibration that are three seconds in duration, followed by one interval of one second duration.

The no-beep, no-vibrate choice does not preclude display notification. Similarly, notification might be limited to audio, with no visual display notification provided. For example, when a stock object page is received on Nomad, a user may want to notified with a short beep to indicate its receipt, but a display change notification or a long beep would be distracting and unnecessary for notifying the user of a minor event such as this.

Notification When A Page Is Received

Notification occurs when the pager receives an item via radio, i.e., as a page transmission. Therefore, both object pages (such as applets, PIM updates and other types of data, phone records, etc.) and ordinary pages (i.e., alphanumeric message pages of the type conventionally transmitted to paging receivers) fall into this category. Most people are familiar with the concept of ordinary pages, but objects pages are a unique type of page. Object pages are a specific block of information or data that cannot be interpreted like an ordinary page and would be meaningless if received by a conventional paging receiver.

Cap Codes: Those who are not familiar with paging terminology may not have encountered the term "cap code." This term indicates the type of page being transmitted. Paging systems require that every page transmitted include a cap code, and a conventional pager only receives pages (i.e., processes pages) with cap codes that it is authorized to accept. Like conventional pagers, Nomad is enabled to receive pages having a number of different cap codes. Typically, one of these cap codes is the user's personal cap code, and others are used for services (news headlines, sports headlines, etc.) that identify pages broadcast to many users.

When (Nomad-specific) page objects are sent via radio, they too must be associated with a cap code on the target Nomad pager(s). The cap code association is irrelevant to the present invention and is determined behind the scenes by a page object generator. The association does, however, determine the folder or directory in which the "page" is placed while it awaits processing by the user. When the user processes a page object, it is removed from the page store and stored in the designated folder for that type of page object, or in a default folder. The page store is a temporary storage area for an unprocessed page object, but is the home for all other pages, numeric and alphanumeric.

Folders: Nomad can have multiple folders (directories) for incoming pages. When setting up Nomad on the PC, the user can selectively label these folders. The user can assign cap codes to different folders stored in the PC using the software, before the data folders are downloaded.

Data Exchange System and PC Executed Software (Proteus)

The software developed to download applets and facilitate data exchange between Nomad and the PC, and also used to setup Nomad is currently referred to by the project name "Proteus." This software is executed on the PC to permit data to be exchanged between Nomad and the PC as noted above. FIG. 5 is a block diagram that illustrates components 130 that are used for exchanging PIM data, applets, and other data between the PC and Nomad device. A Proteus repository and Send Manager 132 serves as the control for any data exchange. Microsoft Corporation's SCHEDULE+™ PIM (or other PIM software) can serve as the source of data that are to be downloaded into Nomad, as indicated in a block 134. If the SCHEDULE+ PIM software is the source of the PIM data, a block 136 indicates that a Wizard is provided in this software to facilitate the PIM data download operation, assisting the user in selecting specific portions of the PIM data that are to be downloaded. A block 138 provides a "grabber" for conveying data bidirectionally between the PIM software and the Proteus control software.

In addition to PIM software applications, database applications and other programs can exchange data with Nomad, as indicated in a block 140. The other applications are coupled to the Proteus control through ISV provided interface software, as noted in a block 142. Also preferably coupled to the Proteus control are a Page archiver 144, a list editor 146 that is used for editing lists (such as To Do lists), a customizer 148, and E-mail interface software 162. The customizer permits options to be selected that customize the operation of Nomad, as noted above.

A synchronizer block 150 is used for synchronizing data stored in Nomad 154 and in the Proteus Repository over an IR port 152. Also coupled to the control is an object maker 156, which is set up to provide paging objects that can be used to edit or update data within Nomad. As explained above, such objects are transmitted as a page over conventional page RF channels. A modem interface 158 couples the object maker to modem hardware 160, so that the object can be conveyed over the phone lines to a paging transmitter and transmitted by radio to Nomad. Also coupled to the object maker is a network interface 166, that provides communication to other computers (not required in the present invention) connected in a local area network (LAN) 168. A page and object sender is also directly coupled to object maker 156, bypassing the Proteus Repository and Send Manager.

PC System Used to Transmit Page Objects

Figure 6:
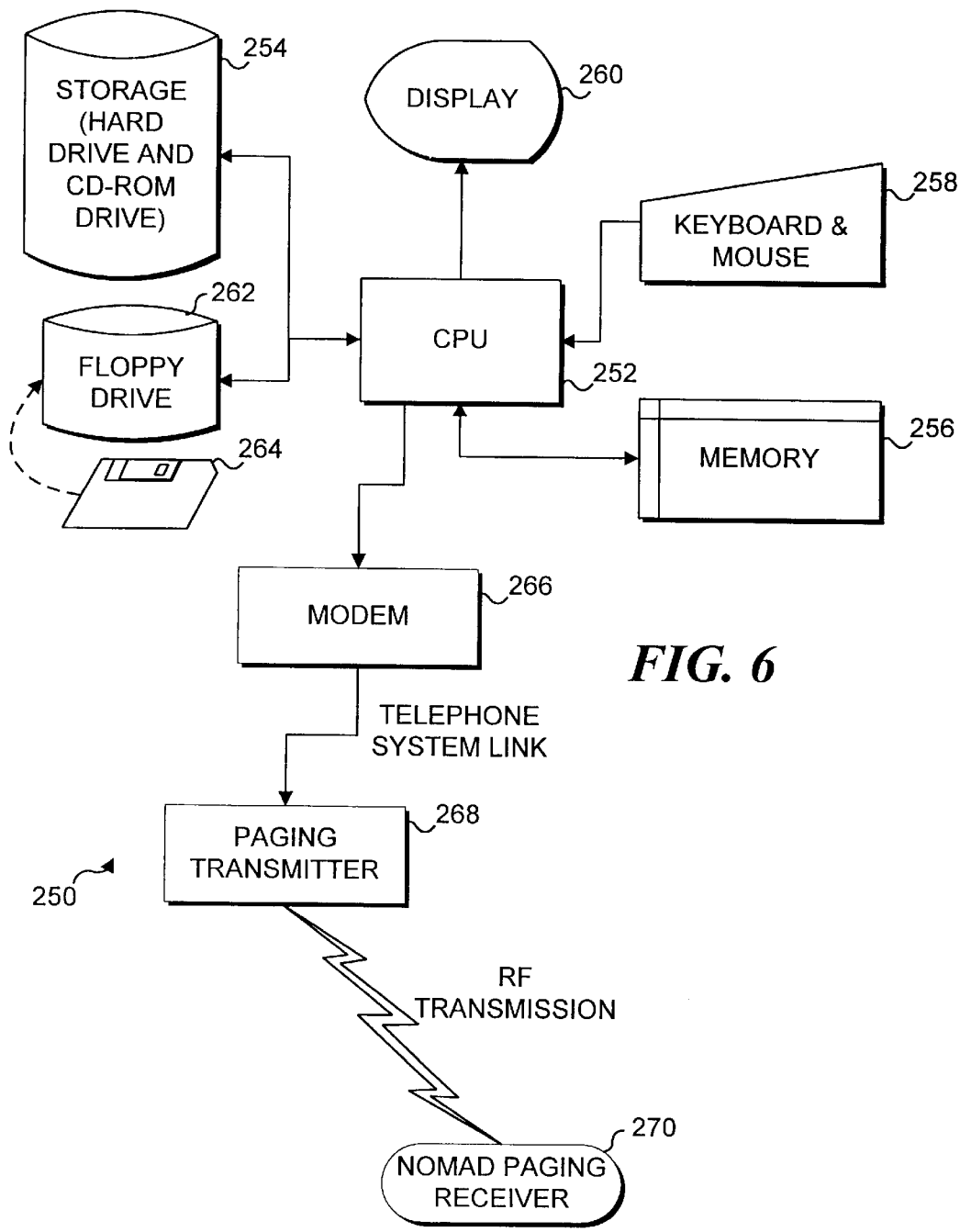
FIG. 6 is a block diagram of a generally conventional personal computer used for transmitting page objects to Nomad in accord with the present invention.

FIG. 6 illustrates components of a generally conventional PC system 250 that is used to transmit page objects to Nomad and to determine the sender's preference for notifying the user upon the receipt of a page object by Nomad. A CPU 252 is included to implement machine instructions that define each of the functions implemented by PC system 250, including the functions related to determining the data comprising the page object and the sender's preference for visual and audible notification of the recipient carrying Nomad. Storage 254, e.g., a hard drive, is provided for storing application programs and data employed by CPU 252. The high capacity non-volatile memory comprising storage 254 is coupled bidirectionally to CPU 252, as is a floppy drive 262. The floppy drive is provided to read and write to a floppy disk 264. It is likely that the software comprising machine instructions controlling the paging and notification functions of the present invention will be distributed on such a floppy disk for loading into the hard drive comprising storage 254.

When the sender wants to send a page object to Nomad, the software comprising the machine instructions that control the paging functions is loaded into a memory 256 that includes both ROM and RAM. Once loaded into RAM, the machine instructions are executed by CPU 252 to implement the paging functions and selection of the notification parameters that the sender prefers be associated with the page object being sent.

Also included in PC system 250 is a display 260, which is coupled to CPU 252 (typically through a display interface card that is not separately shown). The sender can use a keyboard and mouse 258 for composing paging messages or for selecting other types of page objects that are transmitted to Nomad. By employing the keyboard and/or mouse, the sender can select the desired visible and audible notification and other parameters associated with the page object before it is transmitted to Nomad. If these parameters are not selected by the sender, default parameters are used. The CPU is connected to a modem 266 to enable communication of data over a conventional telephone system link to a paging transmitter 268. Modem 266 is only one of several different ways for the CPU to communicate with paging transmitter 268. The paging transmitter produces the RF transmission that conveys the page object to a Nomad paging receiver 270. This depiction of page object transmission is grossly simplified, but the details of the paging system are not essential to the present invention. Thus, the relatively complex paging transmitter system that is conventionally employed to ensure that a page transmission will reach the intended recipient at any point in a relatively large geographic area is not shown.

Flexible Object Notification

When a conventional or ordinary page message is received by Nomad, it alerts the user visually (by a change in the text displayed, flashing the display, etc.), audibly (by producing beeps, a melody, ringing, or other sound), or by a mechanical vibration that is felt through the housing of the device. These notification methods are well known in the paging and cellular industries for use in indicating an incoming transmission. The primary purpose of any simple page message is to alert the user and provide information enabling the user to call a specific person—therefore, in response to such conventional page messages there is very little or no need for implementing any schemes that let the user customize how he/she will be alerted on the arrival of the message. Even if some customization exists in a conventional paging device, it applies to all messages from known sources. Additionally, in regard to notification of the user when a conventional page message is transmitted and received on a conventional page receiver, there is no provision for the sender of the message to control how the user will be notified.

Because page objects can be received by Nomad, the assumption that the primary purpose of notification is to alert the user to a conventional incoming page message is no longer true. In many cases, there will be no need to notify the user when a paging object has been received by Nomad. For example, a movie listing service may want to update the movie database stored in the user's Nomad on a periodic basis. For such page objects, there is no need, indeed it is a nuisance, to alert the user each time a page object carrying movie database updates is received.

Nomad lets the user as well as the sender control how the user is notified when any object is received. Greater flexibility is thereby provided, since the notification for each object received can be separately set. However, the user and sender may both attempt to control the object notification, and there may be a conflict in the way each wants the user to be notified when a specific type of object is received by Nomad.

EXAMPLES

1. An assistant sends a PIM schedule change page object and wants it to produce an audible as well as a visual notification when it is received so that the recipient will likely be alerted to the change.

2. A stock quotes provider wants to send stock page objects to a Nomad many times a day, but does not want to bother the user with audio or visual alerts when the stock page objects are received unless there is a large change in a stock's price. The stock quotes provider thus will want to selectively alert the user with either audible or visual notification (or both) when a stock quote database update is received by Nomad.

3. A user goes into an opera or a movie theater and does not want Nomad to make any sound even if the sender has determined that the object being received requires an audible notification be provided to alert the user (as in 1 above).

Rules Applied to Control Notification:

Nomad addresses the problems noted in the above examples by applying the following rules:

1. Each folder and each received page object have NotifyOption fields (defined below). Thus, it is possible to set the NotifyOption field separately on every item that is received. In addition, each received page object has a NotifyMask (defined below).

2. Nomad maintains an Audio table containing audio patterns. These patterns include beep, musical note, and vibrator sequences, or a combination of such sequences for each type of audible notification.

3. Notify Parameters:

3.1 The NotifyOption field, which is setup for each folder on Nomad using the PC, has the following sub-fields:
UseObject: This one-bit field is valid only for a folder. It is ignored in the received object data. When this bit is set to TRUE, the NotifyOption field of the folder is ignored and the NotifyOption field of the received page object controls the type of notification provided to the user.
Visual: If this bit is set to TRUE, visual notification will be provided. If the bit is set to FALSE, visual notification will NOT be provided.
AudioIndex: If these four bits are set to 0 (FALSE), audio notification will NOT be provided. If the four bits are set to a non-zero value, that value specifies the index into the Audio table to indicate the desired audio pattern that will be used in the audio notification of the user. Use of more than four bits expands the number of possible options in the Audio table.
Verbose This bit determines whether verbose error notification is enabled.

3.2 NotifyMask field has the same sub-fields as NotifyOptions. The contents of the NotifyMask are bits used for masking a field or a sub-field that are sent with the received object, i.e., the sender can choose the bit patterns in the NotifyMask field to control and override the sender selected NotifyOptions.

4. The device has three option flags that can be set by the user. These flags are:

| | |
|---|---|
| fSound | If set to TRUE, audible notifications are allowed. |
| fMapSound | Used only when fSound is TRUE. If fMapSound is set to TRUE, then a user defined alternate sound, which could be a beep, melody, or vibrator sequence (or a combination thereof), is used to alert the user. |
| fVisual | If set to TRUE, visual notification is allowed. |

5. When an object is received, the following algorithm is used to arrive at the desired notification:
(Note that the ReceiveFolder identifies the folder into which the received object will be placed.)

```
5.1  If ReceiveFolder.NotifyOption.UseObject (stored in Nomad) is
     TRUE, then the following logic controls the notification used:
5.2       VisualNotify = (ReceiveFolder.NotifyOption.Visual
                      AND Object.NotifyMask.Visual)
                      OR Object.NotifyOption.Visual
5.3       AudioNotify                  =
(Receive.Folder.NotifyOption.AudioIndex
                      AND Object.NotifyMask.AudioIndex)
                      OR Object.NotifyOption.AudioIndex
5.4  Else (i.e., if ReceiveFolder.NotifyOption.UseObject is FALSE)
5.5       VisualNotify = ReceiveFolder.NotifyOption.Visual
5.6       AudioNotify                  =
ReceiveFolder.NotifyOption.AudioIndex
5.7  EndIf
```

(The sequence of AND and OR operations give another level of control—the page object determines if the desired sub-field from the ReceiveFolder.NotifyOption will be used or whether the page object will supply its own. For example, the page object may indicate that the AudioIndex sub-field from the ReceiveFolder will be used, but supply the Visual sub-field. Thus, the audio pattern to be played for audio notification will be under the user's control, but the visual notification will be determined by the page object, i.e., by the sender.)

```
5.8   If (fVisual is TRUE) AND (VisualNotify is TRUE), then
5.9       Perform the visual notification
5.10  Else
5.11      Do NOT perform the visual notification
5.12  Endif
5.13  If AudioNotify is a non-zero value, Then
5.14      If fSound is TRUE, Then
5.15          If fMapSound is TRUE, Then
5.16              Play alternate sound
5.17          Else (i.e., if fMapSound is FALSE)
5.18              Play sound determined using AudioNotify
                  as index into the system audio table to
                  identify the sound sequence used for
                  audible notification
5.19          EndIf
5.20      Else (i.e., if fSound is FALSE)
5.21          Do NOT provide audio notification
5.22      EndIf
5.23  Else
5.24      Do NOT provide audio notification to the user
5.25  EndIf
```

EXAMPLES

1. An assistant sends a schedule change object and wants it to make an audio as well as visual alert so that the recipient is well aware of the change.

Assume the following:

User has set ScheduleFolder.NotifyOption.UseObject= TRUE

User has set ScheduleFolder.NotifyOption.Visual=TRUE

User has set ScheduleFolder.NotifyOption.AudioIndex=5

Sender has set Object.NotifyMask.Visual=TRUE

Sender has set Object.NotifyMask.AudioIndex=0

Sender has set Object.NotifyOption.Visual=TRUE

Sender has set Object.NotifyOption.AudioIndex=6

Since ScheduleFolder.NotifyOption.UseObject is TRUE, statement 5.2 will be executed, i.e., VisualNotify= (ReceiveFolder.NotifyOption.Visual AND Object.NotifyMask.Visual) OR Object.NotifyOption.Visual, which reduces to: (1 AND 1) OR 1, resulting in:

VisualNotify=TRUE

Also, because ScheduleFolder.NotifyOption.UseObject is TRUE, statement 5.3 will be executed, i.e., AudioNotify=(Receive.Folder.NotifyOption.AudioIndex AND Object.NotifyMask.AudioIndex) OR Object.NotifyOption.AudioIndex, which in binary notation reduces to (0101 AND 0000) OR 0110, resulting in:

AudioIndex=6 (i.e., 0110 in binary notation)

Because these two parameters have the above values, Nomad will attempt to cause a visual notification as well as an audible notification using the type of sound indicated in the audio index table at pointer 6. Normally, fVisual and fSound flags are TRUE and fMapSound is FALSE. Therefore, visual and audible notifications will be done as desired by the sender, but consistent with the user's selected options.

Now suppose the user is going to an opera or into a movie theater (as in Example 3 above). The user will then set the fMapSound flag to TRUE on Nomad. When the page object is received, the logic in lines 5.15 and 5.16 (above) will cause the alternate audio notification (which would normally be a vibration of the Nomad housing) to be employed in notifying the user of the receipt of the page object. Optionally, one of a plurality of defined vibration patterns can be selected to notify the recipient of the receipt of the page object. The selected vibration pattern can thus indicate the type of page object and its relative priority or importance.

If the schedule change being transmitted to the user is not important and the assistant does not want to generate any alerts, then the assistant can set the object fields in the following manner:

Object.NotifyMask.Visual=FALSE
Object.NotifyMask.AudioIndex=0
Object.NotifyOption.Visual=FALSE
Object.NotifyOption.AudioIndex=0

The logic in lines 5.2 and 5.3 (above) will now result in the following:

VisualNotify=FALSE
AudioIndex=0

These parameter settings will not cause any visual or audio notification, so the object will change the schedule quietly without alerting the user either visually or audibly.

If the user had set ScheduleFolder.NotifyOption.UseObject to FALSE, then no matter what the sender specified object fields are, the notification is strictly under the user's control (due to the logic in lines 5.6 and 5.7 above).

2. A stock quotes provider wants to send stock objects many times a day, but does not want to bother the user with audio or visual alerts all the time except when there is a large change in a stock's price.

The user will set StockFolder fields in the following manner:

StockFolder.NotifyOption.UseObject=TRUE
StockFolder.NotifyOption.Visual=FALSE
StockFolder.NotifyOption.AudioIndex=3

The "regular" stock objects are sent with the following fields set by the sender:

Object.NotifyMask.Visual=FALSE
Object.NotifyMask.AudioIndex=0
Object.NotifyOption.Visual=FALSE
Object.NotifyOption.AudioIndex=0

These parameters values will preclude any visual or audible notification being provided to the user when the stock quote updates are received by Nomad. However, when there is a very important stock object, it will be sent with the following field values set in the page object by the sender:

Object.NotifyMask.Visual=FALSE
Object.NotifyMask.AudioIndex=(bit pattern containing binary 1s only)
Object.NotifyOption.Visual=TRUE
Object.NotifyOption.AudioIndex=0

The above parameter values will cause a visual as well as an audio notification to be provided to the user. Thus, it will be apparent that the present invention provides considerable latitude in controlling the notification provided to the user when a page object is received. The user can override the sender's options, but the user can also selectively enable the sender to control the type of notification provided to the user.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for selectively notifying a recipient that a data object transmitted from a remote site has been received on a portable receiver carried by the recipient, comprising the steps of:

(a) appending a sender preference to the data object transmitted to the recipient, said sender preference identifying at least one of a plurality of options for notifying the recipient that the data object has been received, said plurality of options including an option in which the sender is not provided any notification;

(b) enabling the recipient to define a recipient preference for being notified of the receipt of the data object using at least one of the plurality of options;

(c) upon receipt of the data object by the portable receiver, logically combining the sender preference with the recipient preference to produce a logical result that determines how the recipient will be notified of the receipt of the data object; and (d) using the logical result to control the portable receiver, thereby effecting the notification of the recipient as indicated by the logical result.

2. The method of claim 1, wherein the options for notifying the recipient include an audible notification option, a visual notification option, and a combined audible and visual notification option.

3. The method of claim 2, wherein the audible notification option includes at least one of an audible alarm signal, a melody, and a vibration of the portable receiver.

4. The method of claim 3, wherein at least one of the recipient preference and the sender preference optionally indicates a selected vibration pattern that should be used for notifying the recipient of the receipt of the data object, said vibration pattern being selected from a plurality of different defined vibration patterns.

5. The method of claim 2, wherein the visual notification option includes a change in a visual display.

6. The method of claim 1, wherein the sender preference is defined by a notify bit mask appended to the data object.

7. The method of claim 1, wherein a data object preference is defined within the portable receiver for each different type of data object received, and said data object preference is logically combined with the sender preference and the recipient preference to determine how the recipient will be notified of the receipt of the data object.

8. The method of claim 7, wherein the data object preference is associated with a directory in which the data object will be stored after being received by the portable receiver.

9. The method of claim 1, wherein the recipient preference has priority over the sender preference in determining the option used for notifying the recipient of the receipt of the data object.

10. The method of claim 1, wherein the recipient preference comprises a field of binary data that include a bit determining whether the sender preference will be used in determining the option used for notifying the recipient of the receipt of the data object.

11. The method of claim 1, wherein the sender preference includes a field of binary data, including an index to one of a plurality of different audio notification options selectively settable to notify the recipient of the receipt of the data object.

12. A system for selectively notifying a recipient that a data object transmitted from a remote site has been received on a portable receiver carried by the recipient, comprising:
 (a) a memory for storing a plurality of machine instructions that define a plurality of functions implemented by the portable receiver;
 (b) a visually perceptible display for producing a visual notification;
 (c) at least one transducer that is employed to produce at least one of an audible and a tactile vibratory notification; and
 (d) a processor coupled to the memory, the display, and said at least one transducer, said processor being controlled by the machine instructions to implement functions that include:
  (i) responding to a sender preference that is appended to the data object transmitted to the recipient, said sender preference uniquely identifying at least one of a plurality of options for notifying the recipient that the data object has been received;
  (ii) enabling the recipient to define a unique recipient preference for being notified of the receipt of the data object using at least one of the plurality of options;
  (iii) upon receipt of the data object by the portable receiver, logically combining the sender preference with the recipient preference to produce a logical result that determines how the recipient will be notified of the receipt of the data object; and
  (iv) using the logical result to control the portable receiver, thereby effecting the notification of the recipient as indicated by the logical result.

13. The system of claim 12, wherein a notification option includes at least one of an audible alarm signal, a melody reproduced on said at least one transducer, and a vibration of the portable receiver produced by said at least one transducer.

14. The system of claim 13, wherein at least one of the recipient preference and the sender preference comprises a vibration, said vibration optionally comprising a pattern that should be used for notifying the recipient of the receipt of the data object, said pattern being selected from a plurality of different defined vibration patterns.

15. The system of claim 12, wherein the sender preference is uniquely defined by a notify bit mask appended to the data object.

16. The system of claim 12, wherein a data object preference is defined within the memory of the portable receiver for each different type of data object received, said data object preference being uniquely identified with at least one of the plurality of options for notifying the recipient that the data object has been received; and said data object preference is logically combined with the sender preference and the recipient preference to determine how the recipient will be notified of the receipt of the data object.

17. The system of claim 16, wherein the data object preference is associated with a directory in which the data object will be stored when received by the portable receiver.

18. The system of claim 12, wherein the recipient preference has priority over the sender preference in determining the option used for notifying the recipient of the receipt of the data object.

19. The system of claim 12, wherein the recipient preference comprises a field of binary data that include a bit determining whether the sender preference will be used in determining the option used for notifying the recipient of the receipt of the data object.

20. The system of claim 12, wherein the sender preference includes a field of binary data, including an index to one of a plurality of different audio notification options available to notify the recipient of the receipt of the data object.

* * * * *